US012786047B2

(12) United States Patent
Rowe et al.

(10) Patent No.: US 12,786,047 B2
(45) Date of Patent: Nov. 3, 2026

(54) DATA COLLECTION OPTIMIZATION IN MANAGED NETWORKS

(71) Applicant: Ivanti, Inc., South Jordan, UT (US)

(72) Inventors: Robin Rowe, Daresbury (GB); Todd Labrum, South Jordan, UT (US)

(73) Assignee: Invanti, Inc., South Jordan, UT (US)

( * ) Notice: Subject to any disclaimer, the term of this patent is extended or adjusted under 35 U.S.C. 154(b) by 0 days.

(21) Appl. No.: 18/773,426

(22) Filed: Jul. 15, 2024

(65) Prior Publication Data

US 2025/0030593 A1 Jan. 23, 2025

Related U.S. Application Data

(60) Provisional application No. 63/514,200, filed on Jul. 18, 2023.

(51) Int. Cl.
*H04L 41/069* (2022.01)
*G06F 16/22* (2019.01)
*H04L 67/50* (2022.01)

(52) U.S. Cl.
CPC ........ *H04L 41/069* (2013.01); *G06F 16/2228* (2019.01); *H04L 67/535* (2022.05)

(58) Field of Classification Search
CPC .. H04L 41/069; H04L 67/535; G06F 16/2228
USPC .......................................................... 709/226
See application file for complete search history.

(56) References Cited

U.S. PATENT DOCUMENTS

| | | | | |
|---|---|---|---|---|
| 12,061,628 | B1 * | 8/2024 | Malloy ................. | G06F 16/285 |
| 2015/0163121 | A1 | 6/2015 | Mahaffey et al. | |
| 2017/0052831 | A1 * | 2/2017 | Wu ..................... | G06F 11/3476 |
| 2020/0233754 | A1 | 7/2020 | Spurlock et al. | |

(Continued)

FOREIGN PATENT DOCUMENTS

| | | | | |
|---|---|---|---|---|
| EP | 3700135 A1 * | 8/2020 | ......... | H04L 41/0894 |

OTHER PUBLICATIONS

Nikolaidis, E., Chen, S., Cudney, H., Haftka , R. T., and Rosca, R. (Sep. 1, 2003). "Comparison of Probability and Possibility for Design Against Catastrophic Failure Under Uncertainty." ASME. J. Mech. Des. May 2004; 126(3): 386-394. (Year: 2004).*

(Continued)

*Primary Examiner* — Taylor A Elfervig

(57) ABSTRACT

An embodiment includes a method of data collection optimization in a managed network having a digital experience platform that includes collecting data from managed endpoints using first collection criteria. The first collection criteria include a first frequency and a first verbosity. The method includes identifying, in the collected data, device context data that indicates a defined event exists relative to an endpoint. The collected data or the device context data are used to compute a digital experience index. Responsive to the identified device context data, the method includes modifying the first frequency or the first verbosity to implement a second collection criteria relative to a subset of managed endpoints; collecting additional data from the subset of managed endpoints using the second collection criteria; receiving additional context data that indicates the defined event no longer exists; and in response, collecting data from the managed endpoints using the first collection criteria.

18 Claims, 9 Drawing Sheets

(56) References Cited

U.S. PATENT DOCUMENTS

| | | | | |
|---|---|---|---|---|
| 2020/0274782 | A1 | 8/2020 | Balaiah et al. | |
| 2024/0403176 | A1* | 12/2024 | Miura | G06Q 50/40 |

OTHER PUBLICATIONS

Lamár, Krisztián, and József Neszveda. "Average probability of failure of aperiodically operated devices." Acta Polytechnica Hungarica 10, No. 8 (2013): 153-167. (Year: 2013).*

International Search Report and Written Opinion for Application No. PCT/US2024/038430, dated Oct. 25, 2024, 15 pages.

* cited by examiner

DATA COLLECTION OPTIMIZATION IN MANAGED NETWORKS

CROSS-REFERENCE TO RELATED APPLICATION

This application claims priority to and the benefit of U.S. Provisional Application No. 63/514,200 filed Jul. 18, 2023, which is incorporated herein by reference in its entirety.

FIELD

The embodiments described in this disclosure are related to managed device management. In particular, some embodiments are related to systems and methods for data collection optimization in managed networks. Some embodiments are implemented in managed networks implementing a digital experience (DEX) platform.

BACKGROUND

In managed networks, particularly those with digital experience (DEX) platforms, large quantities of data are collected and analyzed by a management system. In some conventional managed networks, agents or engines implemented at endpoints or nodes of the managed networks operate to communicate portions of the data to the management system. Elements of the data collection may be set by the management system. For instance, the management system may dictate a frequency of data collection, types of data collected, etc. In these conventional systems, the elements of the data communicated are static.

The data collection enables a management system to determine operational states of the endpoints or nodes. The collected data form the basis of management operations. For instance, the collected data may indicate an operational issue is experienced at one of the endpoints or experienced at a portion of the managed network. The management system may perform management operations to mitigate the operational issue.

An example of the management operations includes computation of a digital experience index (DEXI) by a DEX platform to assess an experience of a user. For instance, an enterprise may implement the DEX platform to assess whether its network and computing devices adequately support the work performed by its employees. Some DEX platforms rely on large quantities of collected data. An increase in the collected data enables a more accurate and nuanced view of a user's experience.

The data collection, especially with static collection elements, may increase computing resources overhead experienced by the computing devices, the managed network, and the management system. However, the computing devices, computing device functional capacity, and circumstances surrounding the user are dynamic. For instance, the computing devices may age or malfunction and/or the user may travel with their computing device. These and other factors may change circumstances surrounding the data collection. In conventional managed networks, the data collection does not respond to such changes. Accordingly, a need exists in the field of network management to optimize data collection.

The subject matter claimed herein is not limited to embodiments that solve any disadvantages or that operate only in environments such as those described. Rather, this background is only provided to illustrate one example technology area where some embodiments described herein may be practiced.

SUMMARY

A method of data collection optimization in a managed network having a digital experience (DEX) platform. The method may include collecting data from one or more managed endpoints according to first collection criteria in a managed network. The first collection criteria include a first collection frequency and a first collection verbosity. The method may include identifying, in the collected data, device context data that indicates a defined event exists in the managed network relative to the endpoint. Responsive to the identified context data, the method may include modifying one or both of the first collection frequency and the first collection verbosity to implement a second collection criteria relative to at least a subset of managed endpoints of the one or more managed endpoints. The method may include collecting additional data from the subset of managed endpoints according to the second collection criteria. The method may include receiving additional context data that indicates the defined event no longer exists in the managed network. Responsive to receipt of the additional context data, the method may include collecting data from the managed endpoints according to the first collection criteria.

An additional aspect of an embodiment includes a non-transitory computer-readable medium having encoded therein programming code executable by one or more processors to perform or control performance at least a portion of the method described above.

Yet another aspect of an embodiment includes a computer device. The computer device may include one or more processors and a non-transitory computer-readable medium. The non-transitory computer-readable medium has encoded therein programming code executable by the one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

The embodiments described in this disclosure are related to managed device management. In particular, some embodiments are related to systems and methods for data collection optimization in managed networks. Some embodiments are implemented in managed networks implementing a digital experience (DEX) platform.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
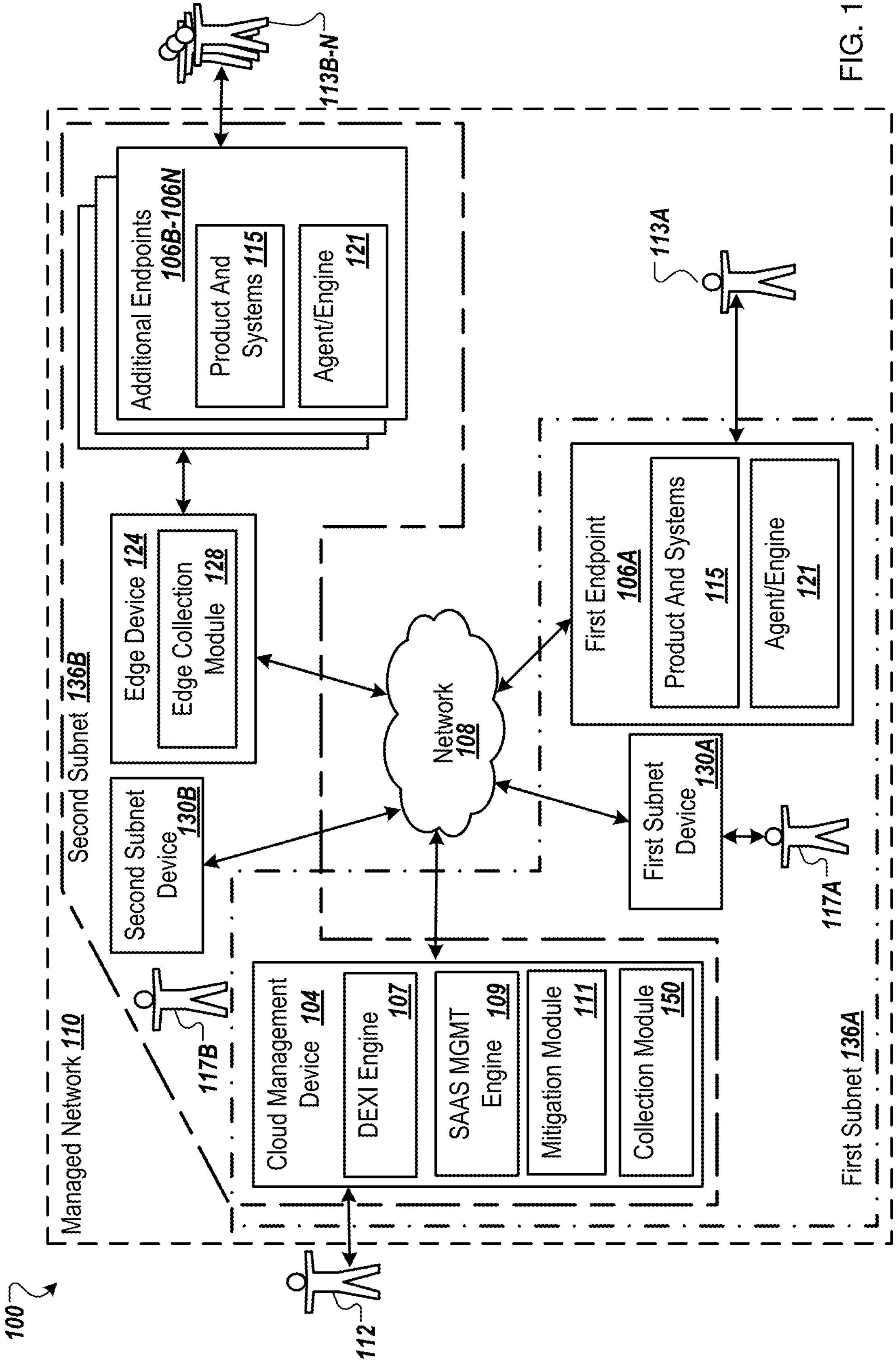
FIG. 1 depicts a block diagram of an example operating environment in which some embodiments described in the present disclosure may be implemented.

FIG. 1 depicts an example operating environment 100 in which some embodiments may be implemented. The operating environment 100 may include a cloud management device 104 communicatively coupled to one or more endpoints 106A-106N (generally, endpoints 106). The cloud management device 104 may include a digital employee experience index (DEXI) engine 107 that is configured to analyze the DEXI of users 113A-113N (generally, user 113 or users 113) and to actively improve analysis tools implemented for this function. The DEXI may be determined at a device-level and/or at a user-level. To generate the DEXI, the DEXI engine 107 may collect and analyze data from the endpoints 106. The collection and analysis of the data from the endpoints 106 imposes a computing resource overhead. For instance, agents 121 at the endpoints 106 may expend computing resources as they gather and aggregate data related to the endpoints 106. Additionally, communication of such data consumes bandwidth in the operating environment 100. The cloud management device 104 may be configured to optimize collection of the data. For instance, the cloud management device 104 may be configured to reduce data collected in some circumstances and may be configured to increase data collected in other circumstances.

For instance, responsive to one of the endpoints 106 experiencing low battery levels, the cloud management device 104 may reduce a frequency or a verbosity of data collected from the endpoint 106. Reduction in the frequency or verbosity may reduce energy usage at the endpoint 106 during the period of low battery levels. Alternatively, one of the endpoints 106 may be experiencing a security attack. In these and other circumstances, the data collected from the endpoint 106 may be increased, which may help ensure data collected properly reflect an experience of the user 113.

The cloud management device 104 may be configured to modify collection criteria to optimize data collection. Modification of collection criteria (e.g., reduction of a frequency) may be based on context data. The context data includes some data indicative of a particular context of the endpoint 106, which may be used to automate modifications to the collection criteria. The context data may be included as a portion of all data collected from the endpoints 106. Accordingly, the cloud management device 104 may parse collected data for the context data. Based on receipt of the context data, the cloud management device 104 may modify collection criteria.

The optimized data collection may provide a technical advantage relative to systems not implementing optimized collection operations. For instance, in static DEX platforms, data collection may continue to the detrimental function of the endpoint 106. From the example above, continual data collection during reduced battery capacity may result in the endpoint 106 becoming inoperable. However, a reduction of the data collected during the period of low battery capacity, the endpoint 106 may continue to operate. After the battery capacity increases, the data collection may also increase.

In the embodiment of FIG. 1, the operating environment 100 may include the endpoints 106, the cloud management device 104, an edge device 124, and subnet devices 130A and 130B (generally, subnet device 130 or subnet devices 130) that communicate via a network 108. The network 108 is configured to communicate data and information between the endpoints 106, the subnet devices 130, the edge device 124, and the cloud management device 104. These components of the operating environment 100 are introduced in the following paragraphs.

The network 108 may include any communication network configured for communication of signals between the components (e.g., 104, 132, 124, 130, and 106) of the operating environment 100. The network 108 may be wired or wireless. The network 108 may have configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

In some embodiments, the network 108 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 108 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The components of the operating environment 100 may be included in a managed network 110 having a first subnet 136A and a second subnet 136B (generally subnet 136 or subnets 136). The managed network 110 is implemented to enable management of the endpoints 106 by the cloud management device 104. To implement the managed network 110, the endpoints 106 may be enrolled. After the endpoints 106 are enrolled, ongoing management of the endpoints 106 may be implemented by the cloud management device 104. The ongoing management may include overseeing and dictating at least a part of the operations at the endpoints 106 as described in the present disclosure. For instance, the ongoing management may include data collection optimization to support a DEXI computation.

The first subnet 136A (generally indicated by a dash-dot border in FIG. 1) and the second subnet 136B (generally indicated by a long-dash-dash border in FIG. 1) may be associated with a first entity and a second entity, respectively. For instance, the subnets 136 may be associated with an enterprise, a portion of an enterprise, a government entity, or another entity or set of devices (e.g., 104 and 106).

The subnets 136 may be separately managed by the cloud management device 104. For instance, data and resources of the first subnet 136A may not be visible to the second subnet 136B and vice versa. Additionally, some management operations implemented on the first subnet 136A may not be implemented in the second subnet 136B. Accordingly, there are some independent management options implemented in the managed network 110 based on which of the subnet 136 one of the endpoints 106 is included. The subnets 136 may include different components. For instance, the first subnet 136A includes a first endpoint 106A, the cloud management device 104, and a first subnet device 130A. The second subnet 136B includes additional endpoints 106B-106N, the cloud management device 104, and a second subnet device 130B. These components are introduced below.

The endpoints 106 may include hardware-based computer systems that are configured to communicate with the other components of the operating environment 100 via the network 108. The endpoints 106 may include any computer device that may be managed by the cloud management device 104 and/or have been enrolled in a managed network 110. Generally, the endpoints 106 include devices that are operated by the personnel and systems of an enterprise or store data of the enterprise. The endpoints 106 might include workstations of an enterprise, servers, data storage systems, printers, telephones, internet of things (IoT) devices, smart watches, sensors, automobiles, battery charging devices, scanner devices, etc. The endpoints 106 may also include virtual machines, which may include a portion of a single processing unit or one or more portions of multiple processing units, which may be included in multiple machines.

The endpoints 106 include the products 115. The products 115 may include applications, components, systems, drivers, of any kind or type. Some examples of the products 115 may include software applications, enterprise software, operating systems, hardware components, installed printers, memory locations, utilized monitors, ports, plug-ins, services, network communication components, the endpoint 106 itself (or information related thereto), similar computer-related features or components, or combinations thereof. The products 115 may differ between the endpoints 106. For instance, the first endpoint 106A might have a processor with different capacity than the processor of the second endpoint 106B.

The endpoints 106 might also include an agent or local collection engine (hereinafter, "agent" 121 and in the Figures "agent/engine" 121). In some embodiments, the SAAS management engine 109 may interface with the agent 121. For instance, the agent 121 may have a high level of privilege on the endpoint 106, which enables visibility of the agent 121 to the products 115 as well as operational parameters related to or characterizing the products 115. The agent 121 may be configured to exist on the endpoints 106 to support ongoing management of the endpoints 106. The agent 121 may interface with local applications (e.g., the search feature) at the endpoints 106 and may support communication of information back to the cloud management device 104 or to the edge device 124. In some embodiments, the DEXI engine 107 may be configured to interface directly with the agent 121. In some embodiments, the DEXI engine 107 might interface indirectly with the agent 121 via the SAAS management engine 109 and/or the edge device 124.

The endpoints 106 may be associated with the users 113. The phrase "associated with" when describing the relationship between the endpoints 106 and the users 113 indicates that the users 113 generally or regularly operate the endpoints 106. Because this association, references to communication of a message or inquiry to the user 113 may indicate that the inquiry is communicated to the endpoint 106 associated with the user 113. Similarly, a response by one of the users 113 may indicate that the user 113 provided user input to the endpoint 106, which is communicated to the cloud management device 104.

The edge device 124 may include a hardware-computing system that is configured to communicate with one or more of the components of the operating environment 100 via the network 108. The edge device 124 may be configured to control communication of data between the additional endpoints 106B-106N. In addition, in some embodiments, the edge device 124 may include an edge collection module 128. The edge collection module 128 may be configured to collect and aggregate attribute data from the additional endpoints 106B-106N in the second subnet 136B. After the attribute data is aggregated at the edge device 124, the edge collection module 128 may communicate aggregated data or some portion to the cloud management device 104. In some embodiments, the edge collection module 128 may receive commands or instructions to modify one or more criteria that at least partially dictate the frequency and/or verbosity of data communication by the edge device 124. For instance, the edge collection module 128 may be configured to communicate attribute data related to the additional endpoints 106B-106N at a first frequency (e.g., every second, every two seconds, etc.). Responsive to the attribute data indicating existence of a defined event at a second endpoint 106B, the collection module 150 may communicate a command to decrease the frequency from the first frequency to a second, lower frequency (e.g., every minute, every two minutes, etc.). The reduced frequency may optimize the data collection while the defined event exists. In response to the attribute data indicating the defined event no longer exists, the collection module 150 may communicate a command to increase the frequency from the second frequency back to the first frequency. Some additional details of optimization of the data collection criteria are described elsewhere in the current disclosure.

The subnet devices 130 may include hardware-based computer systems that are configured to communicate with other components of the operating environment 100. The subnet devices 130 are local, administrative devices implemented in one of the subnets 136. For instance, the first subnet device 130A may be implemented in the first subnet 136A to enable subnet-level control of the first endpoint 106A. In the present disclosure, a subnet administrator 117A or 117B may use the subnet device 130 to define collection criteria and/or events that may trigger modifications to one or more aspects of the collection criteria. The defined collection criteria and/or events may apply to the edge device 124, the subnet 136, one or more endpoints 106 (e.g., based on device type, user role, location, etc.). The defined collection criteria and/or the events may be communicated to the cloud management device 104. The cloud management device 104 and/or the subnet device 130 may implement the collection criteria and/or events in the associated subnet 136 or with respect to one or more of the endpoints

106 to which the collection criteria and/or events pertain. In some implementations, the subnet devices 130 may implement a low-code or no-code application that enables definitions of the collection criteria and/or events. Some examples of the low-code or no-code application are provided elsewhere in the present disclosure.

The cloud management device 104 may include a hardware-based computer system that is configured to communicate with the other components of the operating environment 100 via the network 108. In some embodiments, the cloud management device 104 may be a single server, a set of servers, a virtual device, or a virtual server in a cloud-based network of servers. In these and other embodiments, one or more of the components of the cloud management device 104 (e.g., the DEXI engine 107) may be spread over two or more cores, which may be virtualized across multiple physical machines.

The cloud management device 104 may be associated with an administrator 112. The administrator 112 may be an individual, a set of individuals, or a system that interfaces with the cloud management device 104. In some embodiments, the administrator 112 may provide input to the cloud management device 104. The input provided by the administrator 112 may form the basis of some computing processes and operations performed by the cloud management device 104.

As stated above, the cloud management device 104 operates within the managed network 110 to provide management operations to the endpoints 106. To provide the management operations, the cloud management devices 104 include a SAAS management engine (in the Figures "SAAS MGMT engine") 109 that is configured to perform one or more management operations relative to the endpoints 106. For instance, the SAAS management engine 109 may ensure the endpoints 106 are up to date, may ensure users 113 of the endpoints 106 have access to products and systems 115 (hereinafter, "products 115") suitable for a role or function, the SAAS management engine 109 may provide technical support to the endpoints 106, and the like. Associated with these management operations are data that represent attributes of the endpoints 106 in substantially (e.g., with material delay) real time or real time. The attributes each reflect a digital experience metric of the user 113 relative to the endpoint 106. The attributes might include operating parameters of the endpoints 106, network parameters of the managed network 110, acute event parameters, parameters of the products 115, other parameters indicative of or that might contribute to DEXI computation, and the like.

The cloud management device 104 includes a DEXI engine 107 configured to compute the DEXI of each of the endpoints 106 using attribute data. Moreover, as the users 113 operate the endpoints 106 and as issues arise in the managed network 110, the DEXI engine 107 adapts and refines analytical tools used to compute the DEXI. In some embodiments, the DEXI engine 107 enables a holistic view of the experience of the users 113 instead of assessing satisfaction related to one set or group of attributes. Some additional details of an example of the DEXI engine 107 is described in U.S. Patent Application Publication No. 2023-0325756-A1 (application Ser. No. 18/295,555), which is incorporated herein by reference in its entirety.

The cloud management device 104 includes a mitigation module 111. The mitigation module 111 may be configured to mitigate a technical event in the managed network 110. For example, the mitigation module 111 may be configured to mitigate a technical event at the endpoints 106 and/or the edge device 124. Some examples of the technical event are a malfunctioning hardware, a security breach, an unpatched or malfunctioning product (e.g., 115), and the like. The mitigation module 111 may communicate instructions to the endpoint 106 or the edge device 124 that change the state or a condition at the endpoint 106 or the edge device 124.

In some embodiments, the collection module 150 may work in conjunction with the mitigation module 111. For instance, the collection module 150 and the mitigation module 111 may optimize data collection to identify and/or preempt technical events, which may be one of the defined events. For instance, the technical event may include a security breach at the first endpoint 106A. The security breach may be a defined event in the first subnet 136A and the second subnet 136B. Attribute data collected from the first endpoint 106A may be indicative of the security breach at the first endpoint 106A. For instance, the attribute data may include large numbers of files being deleted or encrypted at the first endpoint 106A. The SAAS management engine 109 may identify the security breach and the mitigation module 111 may isolate the first endpoint 106A from the managed network 110. Additionally, the mitigation module 111 may communicate an instruction of the collection module 150 to increase the frequency of data collection related to one or more of the additional endpoints 106B-106N in the second subnet 136B. In particular, collection of attribute data related to file encryption of file deletion by the additional endpoints 106B-106N. The increase in frequency may enable early identification of the security breach at one or more of the additional endpoints 106B-106N. Responsive to the security breach being identified, the mitigation module 111 may isolate the affected endpoint 106.

The cloud management device 104 includes a collection module 150. The collection module 150 may be configured to implement data collection optimization. The data collection optimization may be configured to accommodate for events that occur in the managed network 110. Generally, the events are temporary. Accordingly, while the event exists in the managed network 110, the data collection optimization is implemented. Prior to the event and following the event, data may be collected according to a baseline collection criteria.

For instance, the collection module 150 may be configured to collect data from the endpoints 106. The data collection may be implemented according to one or more collection criteria. A default or a first collection criteria may be implemented during normal or ordinary conditions in the managed network 110. The first collection criteria may be established to support the DEXI engine 107. The first collection criteria may include a first collection frequency and a first collection verbosity. As used in the present disclosure, the term "verbosity" refers to an amount of different data collected from one or more of the endpoints 106. For instance, a high verbosity indicates more data or more types of data are collected, and a low verbosity indicates less data or less types of data are collected. As used in the present disclosure, the term "frequency" refers to a number of samples of a particular data collected. For instance, a high frequency may indicate that a particular data is collected more often (e.g., at a high frequency) than a low frequency. The first collection criteria are set up to support the DEXI engine 107. For instance, the first collection criteria may include a first verbosity and a first frequency sufficient to support a DEXI computation.

The collection module 150 may identify, in the collected data, device context data. The device context data may indicate a defined event exists in the managed network 110 relative to the endpoint 106. The defined event may include a physical condition or an operating condition at the endpoint 106, in one of the subnets 136, or in the managed network 110 during which a change to the first collection criteria may be implemented. The change to the first collection criteria may optimize the data collection to benefit operation of the managed network 110 and/or one or more of the endpoints 106. For instance, the defined event may include location change of one of the endpoints 106 into a location in which data communication is difficult such as poor bandwidth, unsecured networks, and the like. Accordingly, the collection criteria may reduce a data verbosity such that less data is communicated while the endpoints 106 are present in the location. Additionally, the defined event may include a reduction in battery charge at the endpoint 106. The change to the collection criteria may reduce the operating resources at the endpoint 106 dedicated to data collection, which may slow the drain on a battery at the endpoint 106.

Responsive to the identified context data, the collection module 150 may modify one or both of the first collection frequency and the first collection verbosity to implement a second collection criteria relative to at least a subset of the endpoints 106. The collection module 150 may collect additional data from the subset of endpoints 106 according to the second collection criteria. For instance, in a circumstance in which the first endpoint 106A relocates to a location with an unsecured network connection, the second collection criteria may be implemented relative to the first endpoint 106A, while the first collection criteria is implemented for the remaining endpoints 106B-106N.

The collection module 150 may receive additional context data that indicates the defined event no longer exists in the managed network 110. For instance, the additional context data may indicate the first endpoint 106A returns or enters a location with secure network connections. Responsive to receipt of the additional context data, the collection module 150 may collect data from the endpoints 106 according to the first collection criteria. Accordingly, the first collection criteria, which may be a default collection criteria, may be implemented following the defined event.

The DEXI engine 107, the SAAS management engine 109, the mitigation module 111, the collection module 150, the edge collection module 128, at least some of the products 115, the agent 121, combinations thereof, and components thereof may be implemented using hardware including a processor, a microprocessor (e.g., to perform or control performance of one or more operations), a field-programmable gate array (FPGA), or an application-specific integrated circuit (ASIC). In some other instances, the DEXI engine 107, the SAAS management engine 109, the mitigation module 111, the collection module 150, the edge collection module 128, at least some of the products 115, the agent 121, combinations thereof, and components thereof may be implemented using a combination of hardware and software. Implementation in software may include rapid activation and deactivation of one or more transistors or transistor elements such as may be included in hardware of a computing system (e.g., the endpoints 106, the edge device 124, or the cloud management device 104 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 110, one or more subnets 136, one or more cloud management devices 104, one or more endpoints 106, one or more subnet devices 130, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together into a single component or server or separated into multiple components or servers.

Figure 2:
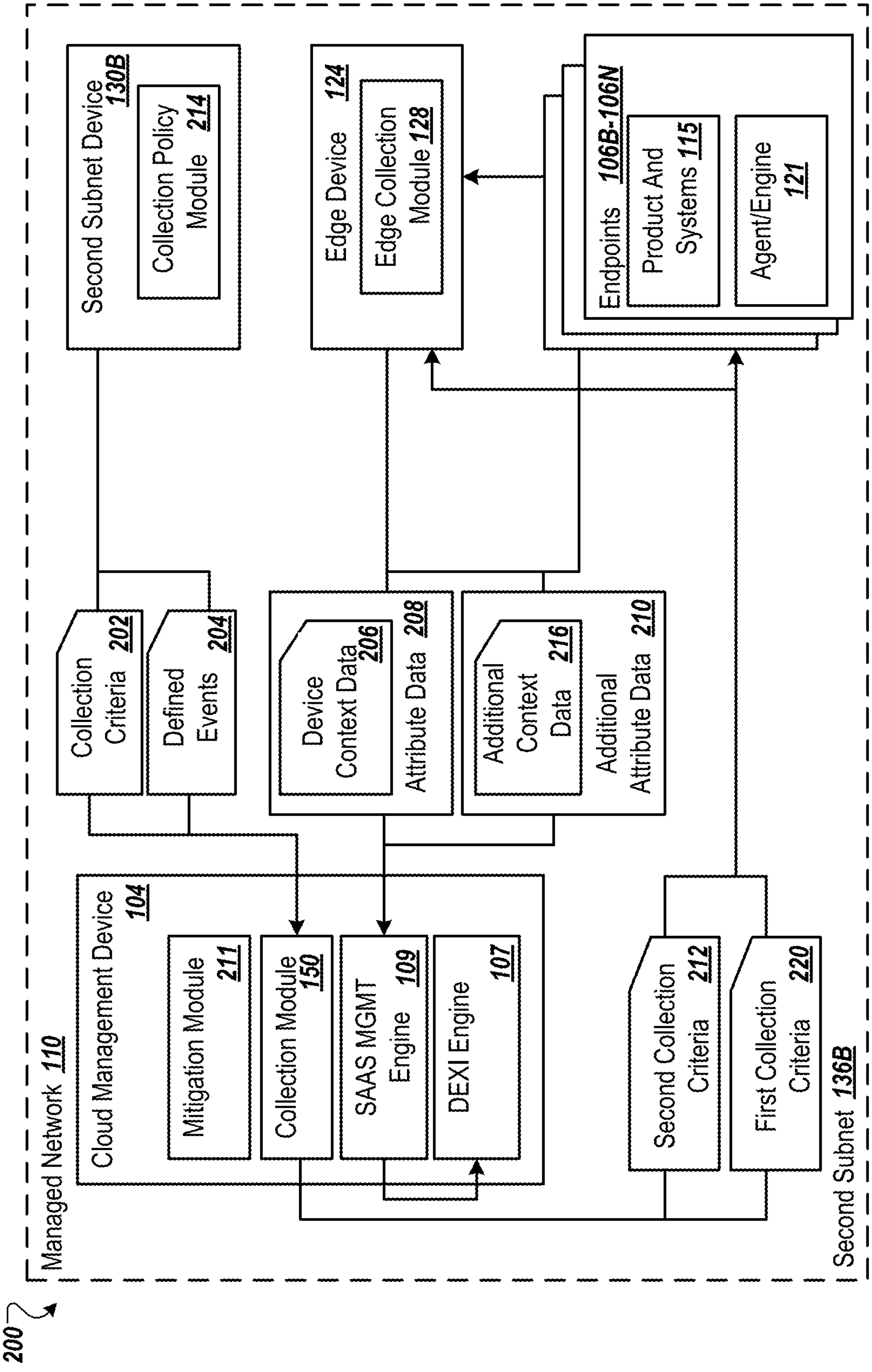
FIG. 2 depicts a block diagram of a data collection optimization process that may be implemented in the operating environment of FIG. 1.

FIG. 2 depicts a block diagram of a data collection optimization process 200 (process 200) that may be implemented in the operating environment 100 of FIG. 1 or another suitable operating environment. The process 200 may be implemented in the managed network 110 or another network that includes a DEX platform. FIG. 2 may include one or more components (e.g., the cloud management device 104, the endpoints 106B-106N, the edge device 124, and the second subnet device 130B, etc.) described with reference to FIG. 1. Although not depicted in FIG. 1, data may be communicated via communication network such as the network 108 of FIG. 1. Additionally, the process 200 of FIG. 2 is described with reference to the second subnet 136B. The process 200 may also be implemented in the first subnet 136A of FIG. 1.

The process 200 may begin with generation of two or more collection criteria 202 and one or more defined events 204. The collection criteria 202 may be implemented responsive to the existence or data indicative of the existence of the defined events 204 in the managed network 110. In the process 200 of FIG. 2, a first or a default collection criteria 220 may be implemented during periods in which the defined events 204 do not exist. Between the defined events 204, the managed network 110 may be considered in normal or standard operation. The first collection criteria 220 may be communicated to the endpoints 106B-106N and/or the edge device 124 to implement data collection during normal operation.

A second collection criteria 212 may also be included in the generated collection criteria 202. The second collection criteria 212 may include a different frequency and/or a different verbosity than the first collection criteria 220. In addition to the second collection criteria 212, the generated collection criteria 202 may include multiple, additional collection criteria. The multiple, additional collection criteria may be implemented during one or more of the defined events 204 and may each include a collection frequency and/or a collection verbosity. The collection criteria 202 may pertain to one or more or a subset of the endpoints 106. For instance, the second collection criteria 212 may pertain to the second endpoint 106B, a third collection criteria may pertain to a third and a fourth endpoints 106C-106D, etc.

In some embodiments, a collection policy module 214 may be implemented to generate the collection criteria 202 and the defined events 204. The collection policy module 214 may be included on the second subnet device 130B. An administrator such as the administrator 117 of FIG. 1 may use the collection policy module 214 to generate the collection criteria 202 and the defined events 204. In these and other embodiments, the collection policy module 214 may include a low-code or a no-code interface that enables the generation of the collection criteria 202 and the defined events 204. Some additional details of the low-code or no-code interface are described elsewhere in the present disclosure.

The collection criteria 202 and the defined events 204 may be communicated to the collection module 150. The defined events 204 may be used by the collection module 150 to determine when changes between the collection criteria 202 are made in the managed network 110. For instance, a first defined event (e.g., a drop in battery charge) may be used to trigger the second collection criteria 212, a second defined event (e.g., detection of a security breach or a vulnerability of a product) may be used to trigger a third collection criteria (not shown), etc.

In the absence of one of the defined events 204, the cloud management device 104 may collect attribute data 208 from the endpoints 106B-106N according to a first collection criteria 220 in the managed network 110. In the process 200 of FIG. 2, the first collection criteria 220 may include a first collection frequency and a first collection verbosity. In some embodiments, the attribute data 208 may be collected from the endpoints 106B-106N directly. In some embodiments, the attribute data 208 may be collected from the edge device 124. For instance, as introduced with reference to FIG. 1, the edge collection module 128 may be configured to receive the attribute data 208 from the endpoints 106B-106N. The edge collection module 128 may then consolidate or otherwise process the attribute data 208. The attribute data 208 or some derivative thereof may be collected from the edge device 124.

In some embodiments, the attribute data 208 may originate from separate domains. Some example embodiments include four subsets of the attribute data 208. For instance, in these and other embodiments, the first subset of attribute data 208 may represent device attributes such as device age, battery status, central processing unit (CPU) usage, memory usage, storage usage, an operating system (OS) update, an OS install date, a boot degradation, a user profile or a portion of the user profile, a system failure indication, a blue screen error notification. The second subset of attribute data 208 may represent security attributes and security data such as antivirus status, firewall status, spyware status, data protection indicators, password strength, patch status, user access control status, risk-based vulnerability assessment. The third subset of attribute data 208 may represent service management attributes such as an incident report, a description and subject of an incident report or ticket, a priority or urgency of an incident report, a mean time to resolve (MTTR), a current status of an incident, a first call resolution, an escalation of an incident, and an inquiry or inquiry response. The fourth subset of attribute data 208 may represent an application attribute such as an application error, a license status of an application, cloud service usage, a cloud service outage, service mapping, application telemetry, application usage indicative of user frustration, an application log, a digital signature of an application, an application scan, survey bot inquiries and responses, and information from bots scheduled to log onto an application.

The attribute data 208 may be received by the SAAS management engine 109, which may communicate the attribute data 208 to the DEXI engine 107. The DEXI engine 107 may use the attribute data 208 to compute a DEXI for one of the users of the endpoints 106B-106N based at least in part on the collected attribute data 208. The DEXI is indicative of a digital experience of a user of one of the endpoints 106 of the managed network 110.

Additionally, the collection module 150 may be configured to monitor the attribute data 208 to identify device context data 206 therein. The device context data 206 indicates one of the defined events 204 exists in the managed network 110 relative to one or more of the endpoints 106B-106N. The device context data 206 may include a piece or portion of the attribute data 208. For instance, one of the defined events 204 may include a low battery charge (e.g., less than 10% charge) at one or more of the endpoints 106B-106N. The attribute data 208 may include data representative of a battery level at the second endpoint 106B, which may be below the low battery charge (e.g., 9%).

Responsive to the identified device context data 206, the collection module 150 may modify one or both of the first collection frequency and the first collection verbosity to implement the second collection criteria 212 relative to at least a subset of the endpoints 106. In embodiments in which the attribute data 208 are locally collected from the second endpoints 106B, the second collection criteria 212 may be communicated to the endpoints 106B-106N. The second collection criteria 212 may be received by the agent 121 to adjust local data collection at the endpoints 106B-106N prior to communication to the SAAS management engine 109. In embodiments in which the attribute data 208 are collected from the edge device 124, the second collection criteria 212 may be communicated to the edge device 124. The second collection criteria 212 may be received by the edge collection module 128 to adjust data collection or processing of locally collected attribute data 208 at the edge device 124 prior to communication to the SAAS management engine 109. For instance, the edge collection module 128 may filter some of the attribute data 208 communicated from the endpoints 106B-106N. Adjustments to the data collection may include changes to frequency of data collection and/or changes to verbosity of data that is collected.

From the example above, a collection frequency of the attribute data 208 from the second endpoint 106B may be reduced and/or some of the attribute data 208 collected from the second endpoint 106B may not be collected, which is an example of a reduced verbosity. The SAAS management engine 109 may collect additional attribute data 210 from the subset of the endpoints 106 according to the second collection criteria 212. The additional attribute data 210 may be similar to the attribute data 208, but may include data that represents different values from the endpoints 106B-106N or the managed network 110. For instance, the additional attribute data 210 may include additional types of attribute data, may omit some types of the attribute data 208, may include the same data sampled at a different frequency, etc. In some embodiments, if the additional attribute data 210 is collected from a first subset of the endpoints 106B-106N, the attribute data 208 may still be collected at the first collection criteria 220 or at another of the collection criteria 202.

While the second collection criteria 212 is implemented, the additional attribute data 210 is collected and used by the cloud management device 104. For instance, the additional attribute data 210 may be used by the DEXI engine 107 to compute the DEXI. Because the additional attribute data 210 is different from the attribute data 208, one or more computational operations implemented by the DEXI engine 107 may be modified. For instance, the DEXI engine 107 may slow the rate at which the DEXI is computed. Additionally or alternatively, the DEXI engine 107 may increase or decrease a weight associated with one or more of the additional attribute data 210 relative to similar attribute data 208 collected prior to the defined event.

The additional attribute data 210 may include additional context data 216. The additional context data 216 may indicate the defined event no longer exists in the managed network 110. For instance, the additional context data 216 may represent a battery level of the second endpoint 106B, which may have increased since the second collection criteria 212 was implemented. Accordingly, the second collection criteria 212 may no longer be implemented in the managed network 110 or with respect to the subset of the endpoints 106B-106N. Responsive to receipt of the additional context data 216, the collection module 150 may modify the collection criteria. For instance, the collection module 150 may communicate an instruction to the endpoints 106B-106N to collect the attribute data 208 from the endpoints 106B-106N according to the first collection criteria 220.

Figure 3:
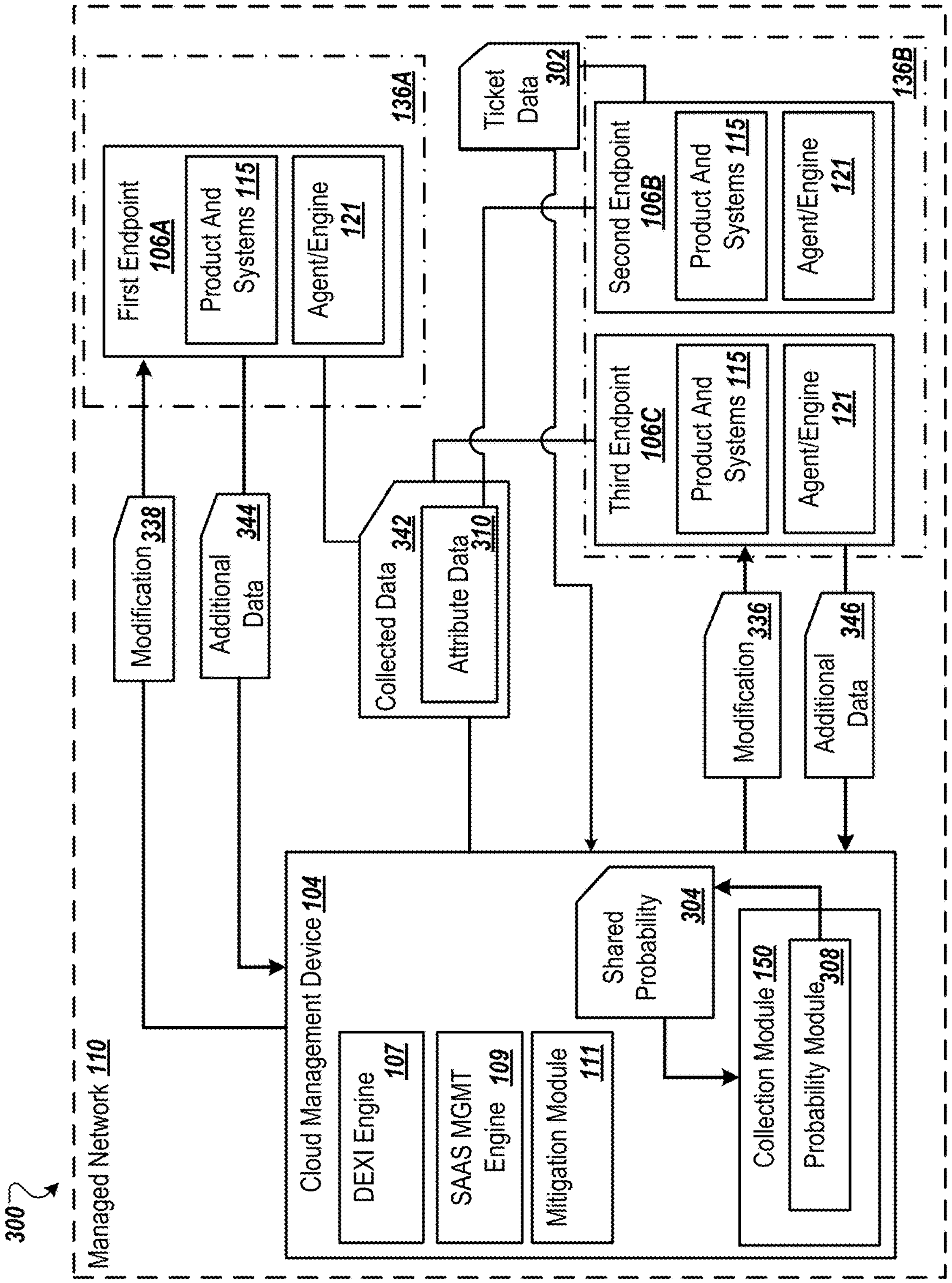
FIG. 3 depicts a block diagram of a first example optimization that may be implemented in the operating environment of FIG. 1.

FIG. 3 depicts a block diagram of a first example optimization 300 that may be implemented in the operating environment 100 of FIG. 1. The first optimization 300 may be an example of the process 200 described with reference to FIG. 2. In the first optimization 300, modifications 336 and 338 to a collection criteria may be based on ticket data 302 and/or a shared probability 304, which may be computed by a probability module 308 implemented in the cloud management device 104.

The shared probability 304 quantifies a likelihood of one or more endpoints 106 will experience or is experiencing a technical event (e.g., a malfunction) that another endpoint 106 is experiencing. The shared probability 304 is based on the commonality of one or more features between the endpoints 106. For instance, the shared probability 304 may be based on the attribute data 208 of the endpoints 106. The attribute data 208 may be included in collected data 342. In the embodiment of FIG. 3, the collected data 342 may be collected according to one or more collection criteria, which may be modified by the modifications 336 and 338 as described in the following paragraphs. The attribute data 208 may include characteristics, systems, and parameters of the endpoints 106. For instance, the attribute data 208 may include device type, products 115, network location, characteristics, or parameters thereof, and the like.

In the first optimization 300, the probability module 308 may be configured to determine the shared probability 304. The shared probability 304 may be determined responsive to receipt of the ticket data 302 or another communication or message indicative of a technical event at one or more of the endpoints 106. The shared probability 304 may be determined between one of the endpoints 106 from which the ticket data 302 originated and relative to one or more other endpoints 106. For instance, in the depicted embodiment, the ticket data 302 may originate at the second endpoint 106B. Accordingly, the shared probability 304 may be determined between the second endpoint 106B and the third endpoint 106C and/or between the second endpoint 106B and the first endpoint 106A.

The endpoints 106 compared in the determination of the shared probability 304 may be included in the same subnet 136 or different subnets 136. For instance, with reference to FIGS. 1 and 3, the shared probability 304 may be determined between the second endpoint 106B and the third endpoint 106C, which may both be included in the second subnet 136B. Additionally or alternatively, the shared probability 304 may be determined between the second endpoint 106B of the second subnet 136B and the first endpoint 106A of the first subnet 136A.

In these and other embodiments, the ticket data 302 indicates a defined event is experienced at the second endpoint 106B. For instance, the defined event may be or include the technical event that prompted or is described in the ticket data 302. Responsive to the defined event, the cloud management device 104 may perform one or more operations to optimize data collection. For instance, responsive to receipt of the ticket data 302, the cloud management device 104 may identify one or more other endpoints 106 that have not experienced the technical event or that there has not been collected data 342 indicative of the technical event.

In the example depicted in FIG. 3, the second endpoint 106B may be experiencing the technical event (e.g., the defined event) and the first endpoint 106A and the third endpoint 106C may be identified as endpoints 106 that have either not yet experienced the technical event or that may be susceptible to the technical event, but the cloud management device 104 has not received collected data 342 positively indicating that the endpoint 106 has experienced or is experiencing the technical event.

The cloud management device 104 may compute the shared probability 304 between the second endpoint 106B and the first endpoint 106A as well as between the second endpoint 106B and the third endpoint 106C. The shared probability 304 is based on features in common between the endpoints 106. For instance, to compute the shared probability 304 between the first and the second endpoints 106A and 106B, the commonalities between the first and the second endpoints 106A and 106B may be analyzed. Responsive to the high correspondence between the features, the shared probability 304 may be high, which indicates a high likelihood of the technical event being experienced by the other endpoint 106. Responsive to the low correspondence between the features, the shared probability 304 may be low, which indicates a low likelihood of the technical event being experienced by the other endpoint 106.

Computation of the shared probability 304 may be based on the technical event and features relevant to occurrence of the technical event. For example, in some embodiments and with some technical events, the shared probability 304 may be a simple comparison. For instance, the technical event may include a nonfunctional application such as an email application that is failing to launch. In this example, the shared probability 304 may simply determine whether other endpoints 106 have loaded thereon the email application. In other examples, the technical event may be caused by or be related to multiple features. In these and other embodiments, the shared probability 304 may be based on a weighted factor formulation. In some embodiments, the shared probability 304 may be computed by use of empirical probability. The empirical probability may be based on historical data in the cloud management device 104. For instance, the cloud management device 104 may have attribute data 208 and the collected data 342 related to the endpoints 106. The attribute data 208 and/or the collected data 342 may be collected from the endpoints 106 over long periods of time, which may be correlated to instances of the technical events. The shared probability 304 may analyze these attribute data 208 and/or the collected data 342 to compute the shared probability 304 using empirical probability. In some embodiments, other probability models include machine learning and artificial intelligence modules may be implemented to compute the shared probabilities. Additionally, combinations of these computational models may be used to compute the shared probability 304.

For example, the ticket data 302 may indicate a malfunction of a hardware component such as a CPU on the second endpoint 106B. Accordingly, one or more characteristics of the CPU of the first endpoint 106A may be compared to similar characteristics of the CPU of the second endpoint 106B. The characteristics in this CPU example may be CPU type, age, operating duty cycle, etc. Responsive to the first endpoint 106A having the same CPU type, a similar age, and a similar operating duty cycle, the shared probability 304 between the first and second endpoints 106A and 106B may be high, which indicates a high likelihood of the first endpoint 106A will or is experiencing the CPU malfunction that is currently being experienced by the second endpoint 106B. A similar computation of the shared probability 304 between the second and third endpoints 106B and 106C may be computed by the cloud management device 104.

Responsive to the shared probabilities 304 being high, the cloud management device 104 may generate the modifications 338 or 336. The modifications 338 or 336 may be communicated to the first and the third endpoints 106A and 106C. The modifications 338 and 336 may modify the collection criteria implemented to retrieve or access the collected data 342. For instance, following the communication of the modifications 338 and 336, additional data 344 and 346 may be collected from the first and the third endpoints 106A and 106B respectively.

The additional data 344 and 346 collected from the first and the third endpoints 106A and 106C may be related to the technical event. For instance, the additional data 344 and 346 is preemptively collected from the second endpoint according to the second collection criteria. The second collection criteria may enable the cloud management device 104 to monitor for the technical event in the ticket data 302. Responsive to context data indicating the first endpoint 106A or the third endpoint 106C is experiencing the technical event, the mitigation module 111 may mitigate the technical event.

Figure 4:
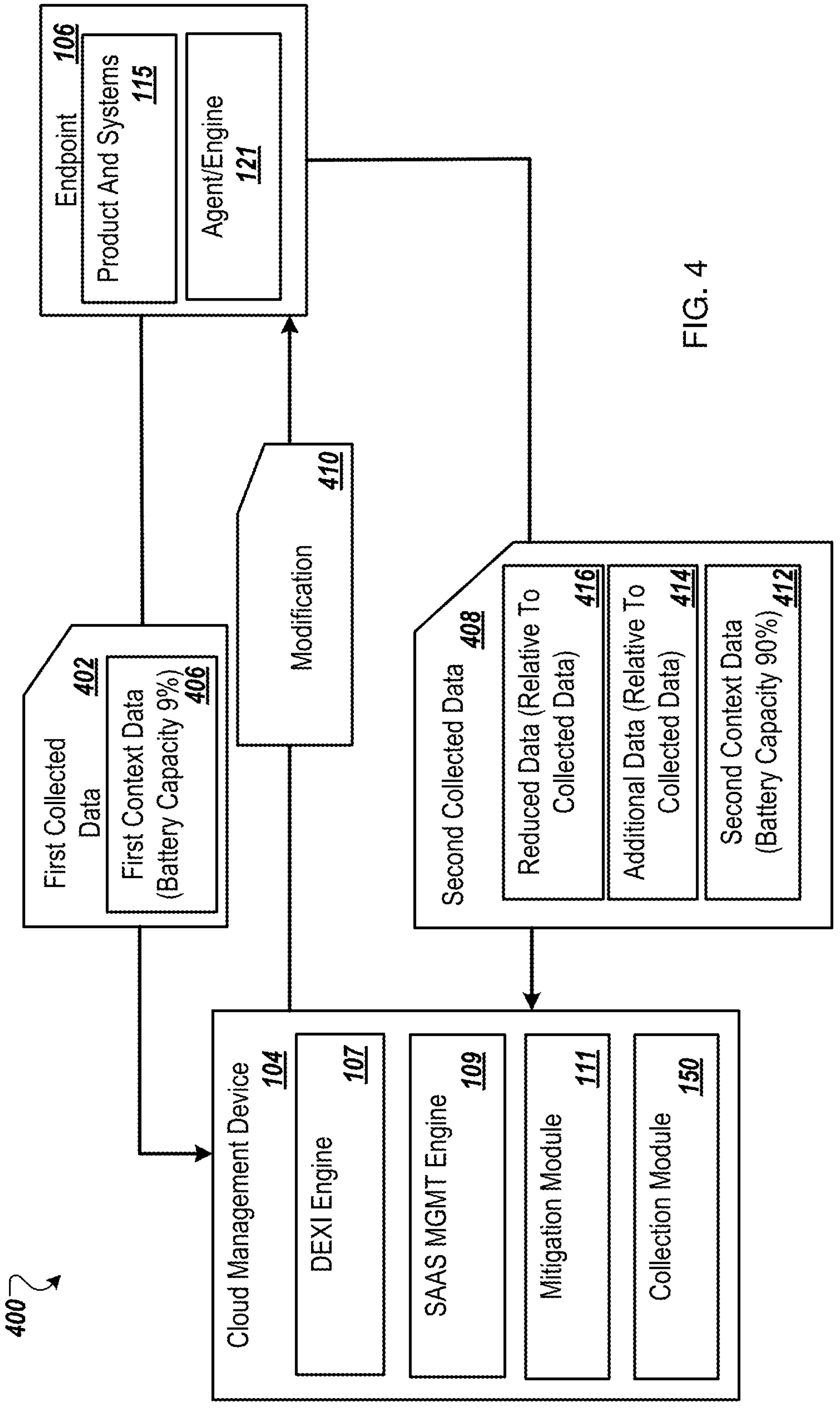
FIG. 4 depicts a block diagram of a second example optimization that may be implemented in the operating environment of FIG. 1.

FIG. 4 depicts a block diagram of a second example optimization 400 that may be implemented in the operating environment 100 of FIG. 1. The second optimization 400 may be an example of the data collection optimization process 200 described with reference to FIG. 2. In the second optimization 400, a modification to a collection criteria may be based on a computing resource availability at the endpoint 106. The modification to the collection criteria may be configured to ensure or enable functionality of the endpoint 106 during time periods in which computing resources have limited availability or are unavailable.

In some embodiments, the computing resource availability at the endpoint 106 may vary as the endpoint 106 is used or as the endpoint 106 ages. For instance, a battery may discharge over long periods of use or because a battery failure. Additionally, an aging or a defective endpoint may experience limited operability of processors, communication devices, memory, etc. In these and other circumstances, the collection criteria may be modified to enable use or limited use of the endpoint 106 while the computing resource availability is reduced and offload the computing overhead involved in the data collection.

In the embodiment depicted in FIG. 4, the collected data 402 may be communicated from the endpoint 106 to the cloud management device 104. The collected data 402 may be obtained according to a first collection criteria. In the second optimization 400, a defined state may include a computing resource metric, which may indicate that the endpoint 106 is operating normally. The collected data 402 may include a first context data 406, which may be related to availability of a computing resource. For instance, the first context data 406 may include an indication that a battery capacity at the endpoint 106 is at 9%. The first context data 406 may accordingly indicate noncompliance with the computing resource metric.

For instance, the collected data 402 may include device attribute data that indicate operational characteristics of the endpoint 106. Some examples of the device attribute data may include device age, battery status, central processing unit (CPU) usage, memory usage, storage usage, an operating system (OS) update, an OS install date, a boot degradation, a user profile or a portion of the user profile, a system failure indication, a blue screen error notification, other device attribute data or combinations thereof. The first context data 406 may evaluate the device attribute data to determine whether the endpoint 106 includes computing resources necessary to continue to communicate the collected data 402. In the embodiment of FIG. 4, the first context data 406 is related to battery status. In some embodiments, the first context data 406 may include one or more other device attribute data that indicates the endpoint 106 has limited operability or limited computing resource availability.

In response, the cloud management device 104 may implement a modification 410. The modification 410 may be to the first collection criteria such that a second collection criteria is implemented relative to the endpoint 106. For instance, the first collection criteria (e.g., used to collect the collected data 402) may include a first collection frequency. The modification 410 may change the first collection frequency to a second collection frequency.

The second collection frequency may change a collection frequency of at least some of the information included in the collected data 402. For instance, the second collection frequency may eliminate collection of some or all of the collected data 402, reduce collection frequency of some or all of the collected data 402, increase collection frequency of some of the collected data 402 while reducing collection frequency of other portions of the collected data 402, etc. For example, the collected data 402 may include data indicative of device age, battery status, memory usage, and CPU usage. The modification 410 may cease collection of information related to device age (e.g., collection frequency of zero), reduce collection frequency of CPU usage and the memory usage (e.g., from every 20 seconds to every 10 minutes), and increase the collection of information related to battery status (e.g., from every 5 minutes to every minute). The modification 410 may not change all data collected from the endpoint 106 and may only affect a subset of data collected from the endpoint 106 in some embodiments. Thus, second collected data 408 obtained according to the second collection criteria may obtain reduced data 416 relative to the collection data 402, additional data 414 relative to the collection data 402, some data that was included the collected data 402, or combinations thereof.

The modification 410 from the first collection frequency to the second collection frequency may reduce data collected by the cloud management device 104. Reduction of the data collected by the cloud management device 104 may reduce computing resources dedicated to data collection communication and reduce networking resources such as bandwidth, edge processing functions, etc. Accordingly, the limited computing resources may not be further expended on the data collection operations.

The modification 410 and the second collection criteria may be implemented while the resource availability issue persists on the endpoint 106. The second collected data 408 may accordingly include a second context data 412. The second context data 412 may indicate that the computing resource availability issue has ended. For instance, in the embodiment of FIG. 4, the second context data 412 may include data indicating that the battery capacity at the endpoint 106 is 90%.

Responsive to the computing resources becoming available at the endpoint 106, the cloud management device 104 may modify the collection criteria implemented relative to the endpoint 106. For instance, the cloud management device 104 may modify the second collection frequency back to the first collection frequency.

Figure 5:
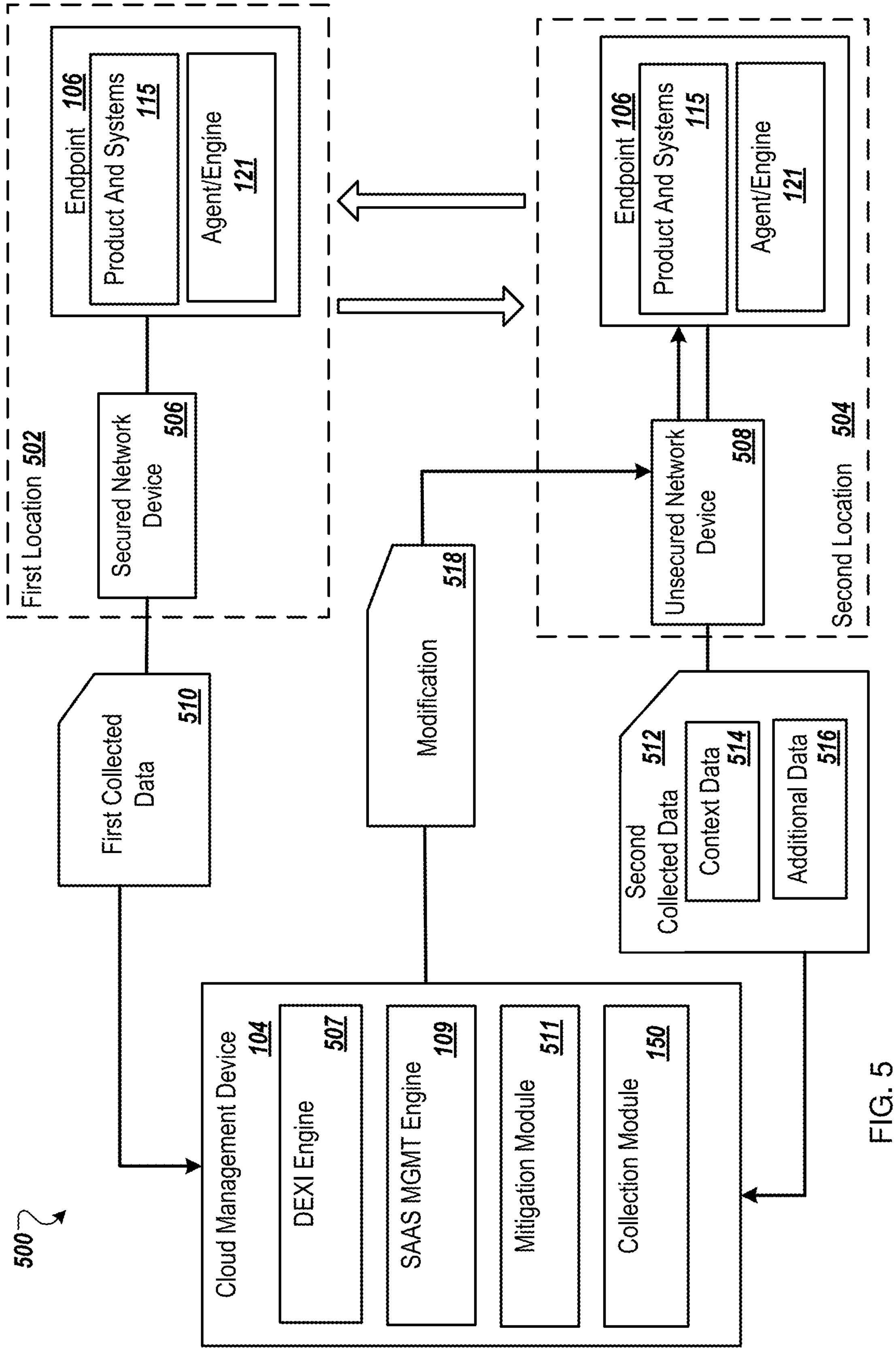
FIG. 5 depicts a block diagram of a third example optimization that may be implemented in the operating environment of FIG. 1.

FIG. 5 depicts a block diagram of a third example optimization 500 that may be implemented in the operating environment 100 of FIG. 1. The third optimization 500 may be an example of the data collection optimization process 200 described with reference to FIG. 2. In the third optimization 500, a modification to a collection criteria is based on a data communication connection between the endpoint 106 and the cloud management device 104. The modification to the collection criteria may be configured to ensure a level of cybersecurity is maintained at the endpoint 106 and/or to ensure security of data and information at the cloud management device 104 as the connection changes.

In some embodiments, the connection changes may be because the endpoint 106 changes geographical location from a first location 502 to a second location 504. At the first location 502 a secured network device 506 is available. Accordingly, first collected data 510 may be communicated via the secured network device 506 to the cloud management device 104. In these and other circumstances, a first collection criteria may be implemented. For instance, the first collected data 510 may include data used to compute a DEXI of the endpoint 106.

The endpoint 106 may change geographic locations to the second location 504. At the second location 504 the unsecured network device 508 may be available. The unsecured network device 508 may include a public access point, an unsecured Wi-Fi router, an unsecured access point, or another network device that is vulnerable to unauthorized access by nefarious actors, for instance. Accordingly, second collected data 512 communicated while the endpoint 106 is at the second location 504 may include context data 514. The context data 514 may include data or information related to a defined state. The context data 514 may be communicated as part of the second collected data 512 via the unsecured network device 508. For instance, the context data 514 may include a source address of the unsecured network device 508 or other data indicating the endpoint 106 has an unsecured connection to the cloud management device 104. In this example, the defined state may include a security compliance metric related to security of network connection between the endpoint 106 and the cloud management device 104. The context data 514 may indicate that the security compliance metric is deficient.

In response, the cloud management device 104 may implement a modification 518 to the first collection criteria to implement a second collection criteria relative to the endpoint 106. The modification 518 may change a first collection verbosity of the first collection criteria to a second collection verbosity responsive to receipt of the context data 514.

For instance, the second collected data 512 may include security attribute data that indicates an operational state of a security feature of the endpoint 106. The security feature may include an antivirus status, a firewall status, a spyware status, data protection indicators, password strength, patch status, user access control status, a risk-based vulnerability assessment, another security feature, or combinations thereof. The first collection verbosity may include collection of a portion of available device attribute data such as a firewall status, an antivirus status, and a spyware status. In some embodiments, the first collection verbosity may be configured such that the first collected data 510 is sufficient to evaluate the DEXI of the endpoint 106.

The second collection verbosity may be greater than the first collection verbosity. For instance, the second collection verbosity may include the firewall status, the antivirus status, and the spyware status as well as data protection indicators, password strength, patch status, user access control status, a risk-based vulnerability assessment, etc. The second collection verbosity may be configured to reduce a likelihood of exploitation of a security vulnerability introduced by the defined state experienced by the endpoint 106. The increased collection verbosity may result in additional data 516 being communicated from the endpoint 106. The cloud management device 104 may adjust computational operations to assess and analyze the additional data. Such computational operations may verify the endpoint 106 is not compromised while communicating via the unsecured network device 508. Responsive to the adjusted computational operations indicating the endpoint 106 is compromised, the mitigation module may implement an action to correct the vulnerability. The increase in the collection verbosity may ensure security of the endpoint 106 is maintained while communicating via the unsecured network device 508.

In some embodiments, the endpoint 106 may subsequently return to the first location 502, which may enable use of the secured network device 506. Responsive to the endpoint 106 communicating via the secured network device 506, the cloud management device 104 may modify the collection criteria implemented relative to the endpoint 106. For instance, the cloud management device 104 may modify the second collection verbosity back to the first collection verbosity. The modification from the second collection verbosity back to the first collection verbosity may reduce data collected by the cloud management device 104. Reduction of the data collected by the cloud management device 104 may reduce computing resources dedicated to data collection communication and reduce networking resources such as bandwidth, edge processing functions, etc.

In FIGS. 3, 4, and 5, the communication is depicted directly between the endpoint 106 and the cloud management device 104. In some embodiment, the optimizations 300, 400, and 500 may be implemented in configurations including the edge device 124 of FIGS. 1 and 2. In these and other embodiments, one or more edge processing functions may be implemented at the edge device 124. Additionally, modifications to collection criteria may be communicated to the endpoint 106 via the edge device 124.

Figure 6A:
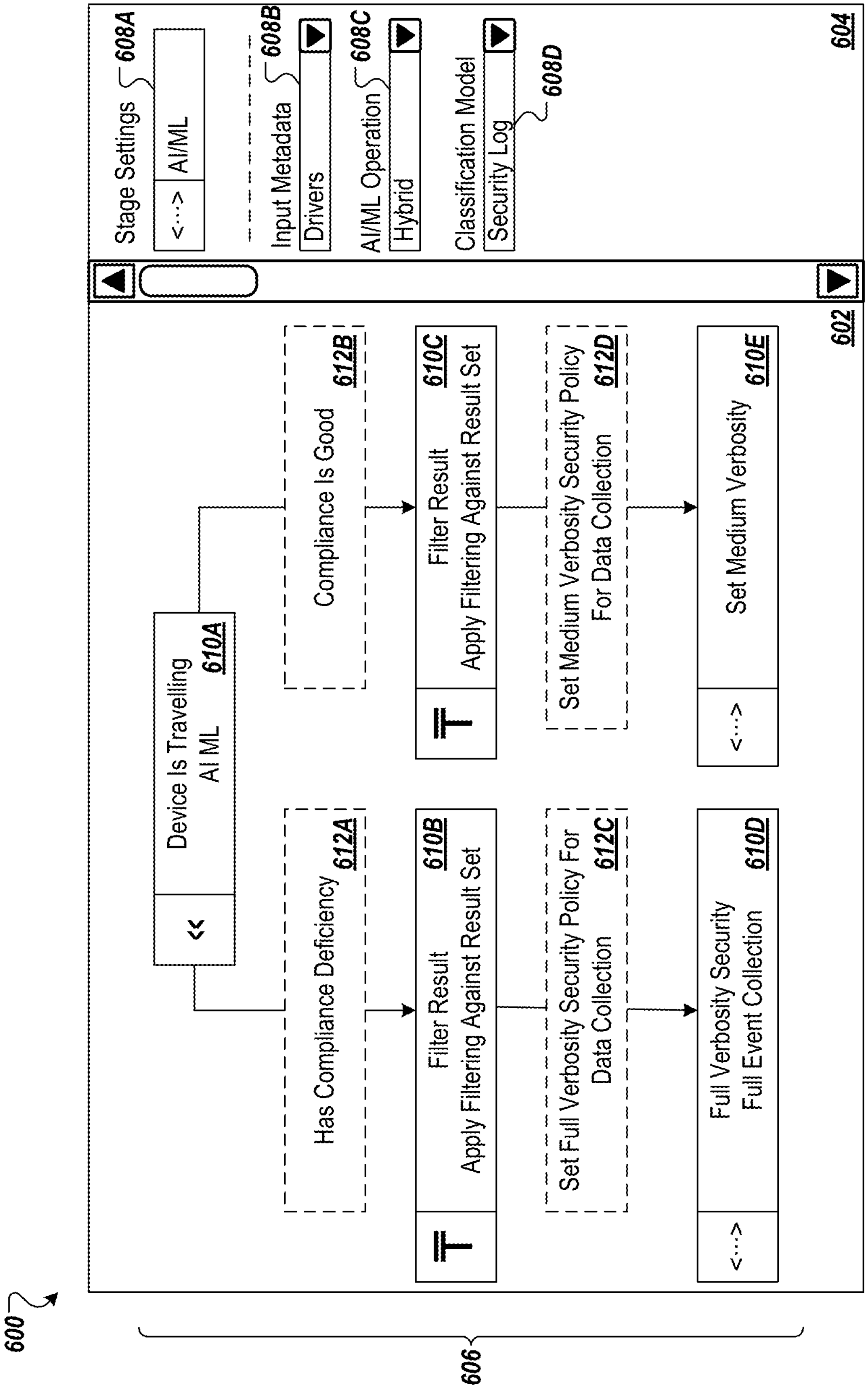
FIGS. 6A and 6B are block diagrams of a user interface UI depicting a low-code or no-code interface that may be implemented in the process of FIG. 2.
Figure 6B:
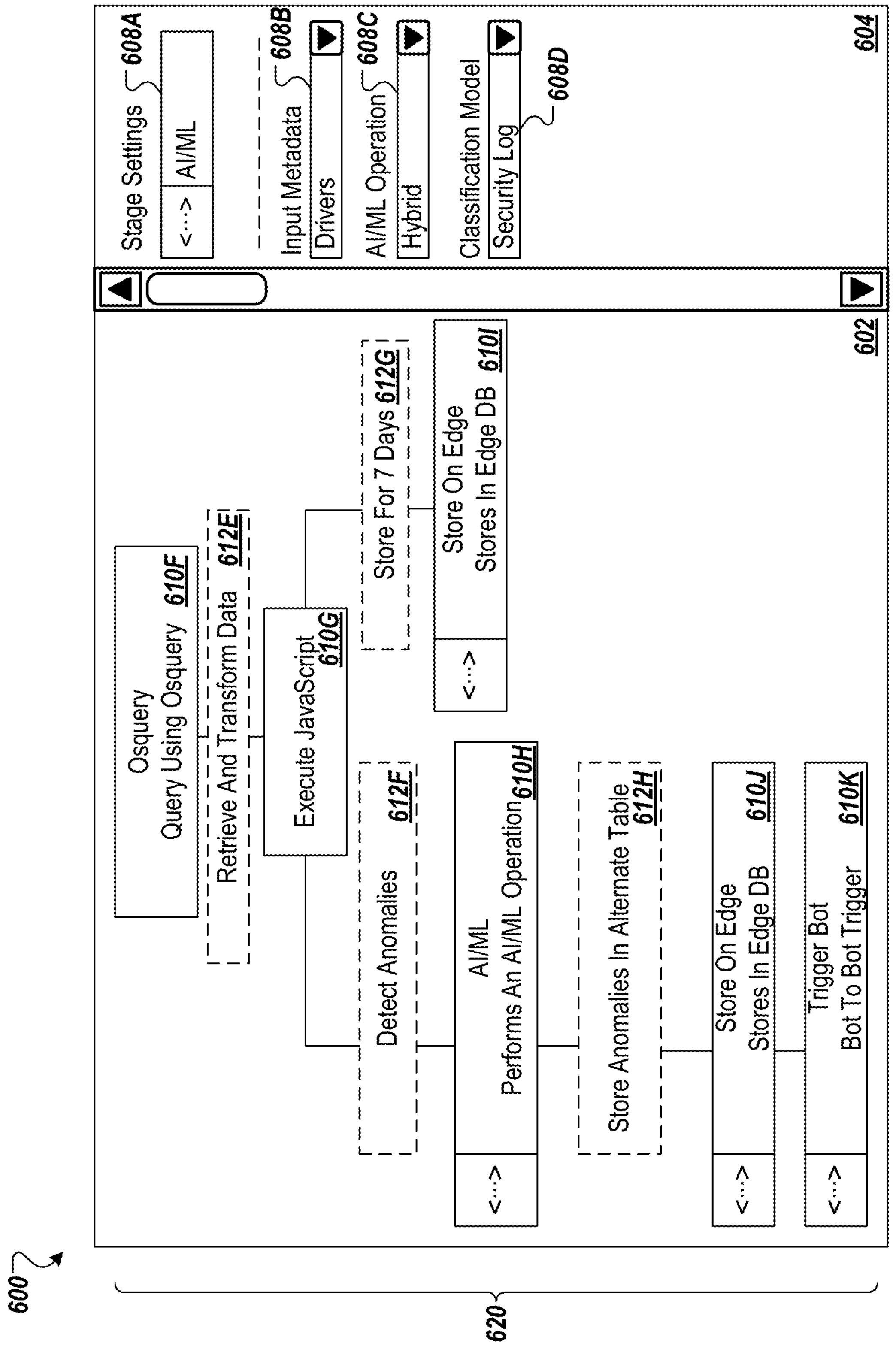

FIGS. 6A and 6B are block diagrams of a user interface (UI) 600 depicting a low-code or no-code interface that may be implemented to generate a data collection policy including defined events and collection criteria. The UI 600 may be implemented to provide input to the collection policy module 214 and/or the SAAS management engine 109 of FIGS. 1 and 2.

The UI 600 of FIG. 6A depicts a travel optimization workflow 606 that may be implemented in a managed network such as the managed network 110 described elsewhere in the present disclosure. For instance, the UI 600 may enable an administrator such as the administrator 117 of FIG. 1 to optimize data collection while one or more endpoints (e.g., 106) in a subnet (e.g., subnets 136 of FIG. 1) travel. The UI of FIG. 6B depicts an edge storage optimization workflow 620 that may be implemented in a managed network that includes one or more edge devices such as the second subnet 136B of FIGS. 1 and 2. For instance, the UI 600 may enable the administrator to optimize data collection and storage at an edge device in response to detected anomalies.

The UI 600 may include a workflow field 602 and a stage definition portion 604. The workflow field 602 graphically depicts the travel optimization workflow 606 in FIG. 6A and the edge storage optimization workflow 620 in FIG. 6B. Each of the travel optimization workflow 606 and the edge storage optimization workflow 620 are discussed below. The stage definition portion 604 provides stage definition fields 608A-608D (generally, definition field 608 or definition fields 608). The definition fields 608 allow selection of properties of operations for each stage 610A-610E of FIGS. 6A and 610F-610K of FIG. 6B (generally, stage 610 or stages 610) of the workflows 606 and 620. Through selections in the definition fields 608, each of the stages 610 may be defined and sequenced. The definition fields 608 may include drop-down menus with pre-defined options, each of which builds a function implemented within the workflows 606 and 620.

In the travel optimization workflow 606 of FIG. 6A, a first stage 610A determines that an endpoint is traveling. The first stage 610A may be based on an analysis of location attribute data collected from endpoints. From the first stage 610A, the travel optimization workflow 606 may proceed to a second stage 610B or a third stage 610C. The second stage 610B and the third stage 610C may implement a filter against a result set. The second stage 610B and the third stage 610C may implement the same filter against the result set to determine whether the endpoint is compliant with a security policy. The result set in the travel optimization workflow 606 may relate to the attribute data that is indicative of compliance of the endpoint. The filter of the second and third stages 610B and 610C may enable visibility of a subset of attribute data related to endpoint compliance. The determination may be based on attribute data related to security settings of the endpoint and/or of a communication connection utilized by the endpoint.

Responsive to the determination that the endpoint is travelling and there is a compliance deficiency, the travel optimization workflow 606 of FIG. 6A may proceed to a fourth stage 610D. The fourth stage 610D implements a data collection optimization. Specifically, the fourth stage 610D implements full verbosity security and full event collection. Accordingly, in response to detection of the endpoint travelling and being non-compliant, which is an example of a defined event, a full verbosity of data collection may be implemented.

Similarly, responsive to the determination that the endpoint is travelling and compliant, the travel optimization workflow 606 of FIG. 6A may proceed to a fifth stage 610E. A third stage 610C may implement the filter against the result set. The fifth stage 610E may implement data collection in which verbosity may be set to "medium," which may be less than the full verbosity of the fifth stage 610E. Accordingly, in response to detection of the endpoint travelling and being compliant, which is another example of a defined event, a medium verbosity of data collection may be implemented.

In FIG. 6A, between the first stage 610A and the second stage 610B, the travel optimization workflow 606 may include a first comment block 612A, "Has Compliance Deficiency" and between the first stage 610A and the third stage 610C, the travel optimization workflow 606 includes a second comment block 612B "Compliance is Good." The first and the second comment blocks 612A and 612B as well as other comment blocks 612C-612H provide insight and directives to the administrator. In some embodiments, the comments blocks 612 may be omitted.

Referring to FIG. 6B, the edge storage optimization workflow 620 may be implemented at an edge device in a managed network. The edge storage optimization workflow 620 may begin with a sixth stage 610F in which a query is implemented. The query may be implemented to pull or access attribute data from one or more endpoints. In some embodiments, the query may be an Osquery. In other embodiments, another query protocol may be implemented. The seventh stage 610G is implemented to execute a JavaScript to receive and transform the attribute data returned from the query of the sixth stage 610F. The eighth stage 610H may implement an artificial intelligence or machine learning based operation to detect anomalies in the transformed data. The tenth stage 610J may be implemented to store detected anomalies in an alternative edge database. This storage may enable further analysis and mitigation. For instance, an eleventh stage 610K may be implemented to actuate a bot to mitigate the anomalies. Additionally or alternatively, a ninth stage may be implemented to store the transformed data at an edge database. The edge database may be separate from the alternative edge database in which the anomalies are stored. In the example of FIG. 6B, the transformed data may be stored for seven days as indicated by a sixth comment block 612G.

Figure 7:
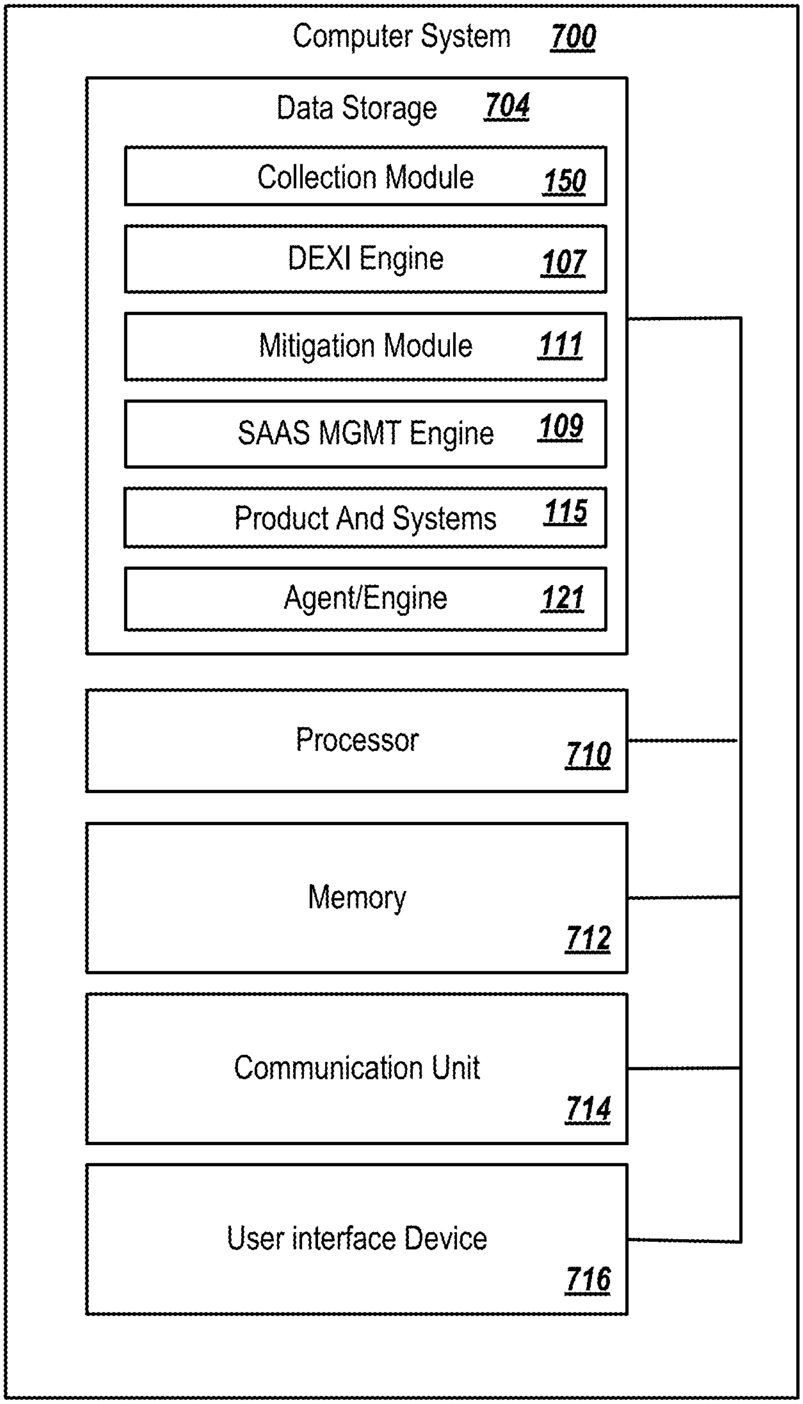
FIG. 7 illustrates an example computer system configured for data collection optimization.

FIG. 7 illustrates an example computer system 700 configured for data collection optimization, according to at least one embodiment of the present disclosure. The computer system 700 may be implemented in the operating environment 100 FIG. 1, for instance. Examples of the computer system 700 may include the cloud management device 104, one or more of the endpoints 106, an edge device, or some combination thereof. The computer system 700 may include one or more processors 710, a memory 712, a communication unit 714, a user interface device 716, and a data storage 704 that includes one or more or a combination of the DEXI engine 107, the agent 121, the products 115, the SAAS management engine 109, and the mitigation module 111 (collectively, system modules).

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computer system 700 and to present the communication to the processor 710 or to send a communication from the processor 710 to another device or network (e.g., the network 108 of FIG. 1).

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The system modules may include program instructions stored in the data storage 704. The processor 710 may be configured to load the system modules into the memory 712 and execute the system modules. Alternatively, the processor 710 may execute the system modules line-by-line from the data storage 704 without loading them into the memory 712. When executing the system modules, the processor 710 may be configured to perform one or more processes or operations described elsewhere in this disclosure.

Modifications, additions, or omissions may be made to the computer system 700 without departing from the scope of the present disclosure. For example, in some embodiments, the computer system 700 may not include the user interface device 716. In some embodiments, the different components of the computer system 700 may be physically separate and may be communicatively coupled via any suitable mechanism. For example, the data storage 704 may be part of a storage device that is separate from a device, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8:
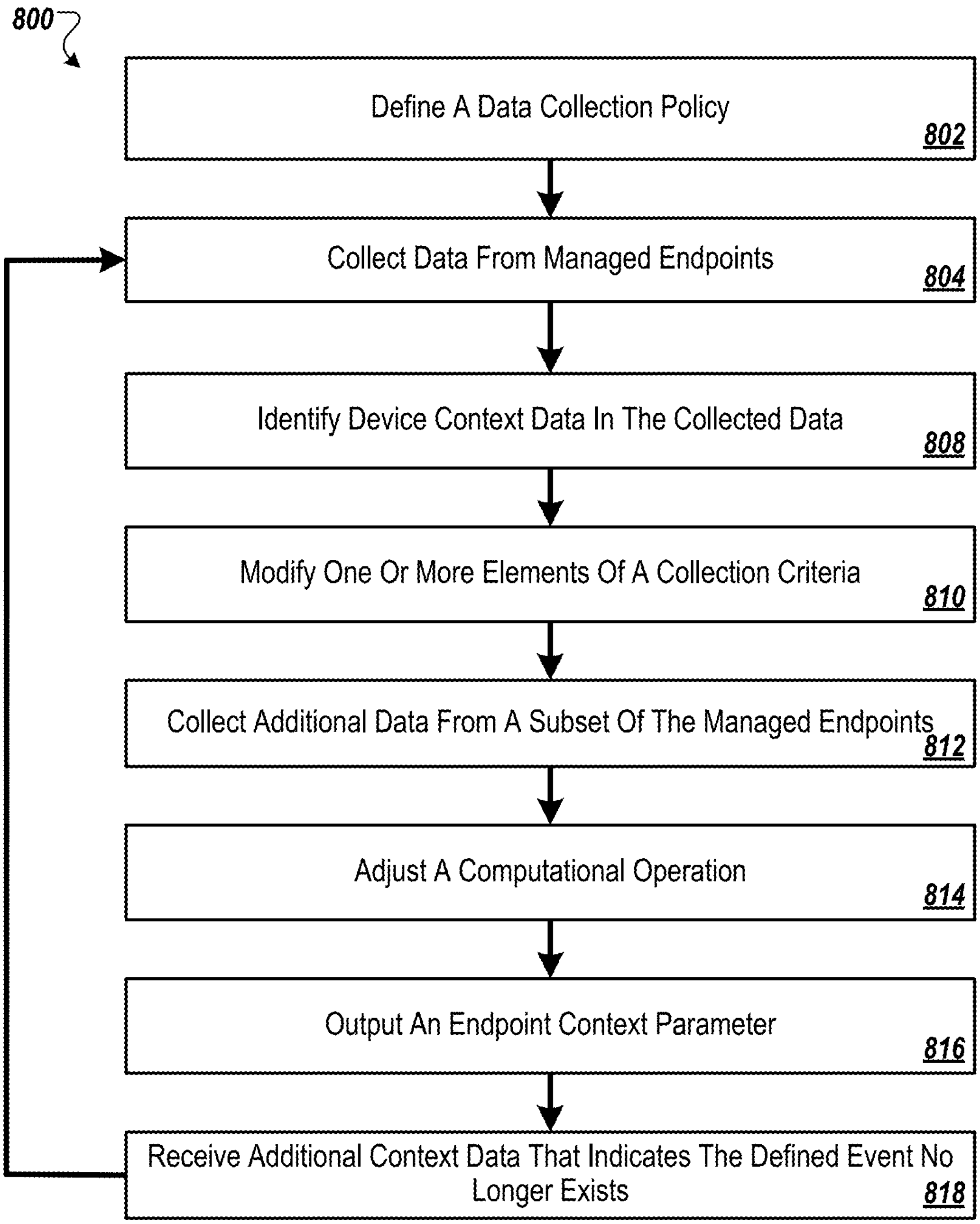
FIG. 8 is a flow chart of an example method of data collection optimization in managed network implementing a DEX platform, all according to at least one embodiment described in the present disclosure.

FIG. 8 is a flow chart of an example method 800 of data collection optimization in a DEX platform, according to at least one embodiment of the present disclosure. The method 800 may begin at block 802 in which a data collection policy is defined. The data collection policy may include one or more elements of collection criteria implemented in the DEX platform as well as events that trigger changes from a first collection criteria to a second collection criteria. For instance, the data collection policy may include one or more collection frequencies, one or more collection verbosities, one or more defined events, one or more edge processing functions, or some combination thereof. In some embodiments, the data collection policy is specified in a low-code interface. The low-code interface may be located within a subnet of a managed network in which the DEX platform is implemented.

At block 804, data from endpoints may be collected. The data may be collected from endpoints of a managed network. For instance, the data may be collected from multiple devices in the managed network such as managed endpoints, edge devices in communication with one or more of the managed endpoints, network elements such as routers, server devices, etc. The data may be collected according to a first collection criteria. In some embodiments, the first collection criteria may correspond at least partially to the data collection policy defined in block 802. For instance, in these and other embodiments, the first collection criteria may include a first collection frequency and a first collection verbosity of the data collection policy.

The data may include attribute data, which may be used to compute a DEXI. In some embodiments, the first collection criteria may be based on data processed and involved in computation of a digital user experience index such as a calculated device index (CDI) of the endpoints. For instance, in these and other embodiments, the first collection criteria may be configured to access attributes from multiple domains of the managed network. The domains may include operational data, security data from a security management system associated with the endpoints, data from a service management system implemented to support the endpoints; data from an application management system; other domains of a managed network, or combinations thereof. The operational data may include data representative of device age, battery status, CPU usage, memory usage, storage usage, an OS update, an OS install date, a boot degradation, a user profile or a portion of the user profile, a system failure indication, a blue screen error notification. The security data may include data representative of an antivirus status, firewall status, spyware status, data protection indicators, password strength, patch status, user access control status, and risk-based vulnerability assessment; data from an application management system such as an application error. The data from a service management system may include data representative of an incident report, a description and subject of an incident report or ticket, a priority or urgency of an incident report, a mean time to resolve (MTTR), a current status of an incident, a first call resolution, an escalation of an incident, and an inquiry or inquiry response. The data from the application management system may include data representative of an application error, a license status of an application, cloud service usage, cloud service outage, service mapping, application telemetry, application usage indicative of user frustration, an application log, a digital signature of an application, application scan, survey bot inquiries and responses, from survey bots, and information from bots scheduled to log onto an application.

In some embodiments, a portion of the data collected from the managed endpoints according to first collection criteria is locally collected by an engine implemented on the managed endpoints. The portion of the data that is locally collected by the engine may be aggregated on an edge device. In these and other embodiments, the first collection criteria may include an edge processing function. The edge processing function may include filtering and/or aggregating the locally collected data prior to use in the computation of the digital user experience index. In some embodiments, the digital user experience index may be computed according to one or more processes described in U.S. Patent Application Publication No. 2023-0325756-A1 (application Ser. No. 18/295,555), filed Apr. 4, 2023.

At block 808, device context data may be identified. The device context data may be identified in the collected data. The device context data may indicate that a defined event exists in the managed network. The defined event may be related to the endpoint. For instance, the defined event may include a circumstance that triggers a change in collection criteria relative to one or more endpoints or devices in the managed network. In some embodiments, the defined event includes a reduction in computing resources available at one or more of the endpoints or devices. An example of the reduction in computing resources may include a dying or dead battery on one of the endpoints. In this example, the device context data may include a signal indicating the endpoint is operating at lower than a particular percentage (e.g., 5%, 10%, 20%, or another suitable percentage) of battery capacity. Additionally, in some embodiments, the defined event may include a communication or security related event. For instance, the defined event may include the endpoint communicating with a management device via an unsecured communication connection such as an unsecured internet access point. In this example, the device context data may include a source address of data transmission packets received from the endpoint. Additionally still, in some embodiments, the defined event includes a technical event such as a malfunctioning software, a lock out condition, a security compromise, an unpatched product, etc. experienced at the endpoint. In this example, the device context data may include information from a ticketing system in a service manager service, a detected patch state ascertained by a patch management system, detected anomalous behavior of the endpoint such as increases in deletion of data files, access from irregular IP addresses, etc.

At block 810, one or more elements of the first collection criteria may be modified. The one or more elements of the first collection criteria may be modified responsive to the identified context data. For instance, the first collection frequency and/or the first collection verbosity may be modified. Modification of the elements of the collection criteria may be performed to implement a second collection criteria. The second collection criteria may be implemented relative to at least a subset of the managed endpoints. In some embodiments, the modifying one or more elements may include modifying the first collection frequency to reduce it to a second collection frequency. For instance, reduction of the first collection frequency may occur while a reduction in computing resources is experienced at the endpoint. Additionally in some embodiments, the modifying the first collection verbosity includes increasing the first collection verbosity to a second collection verbosity to include supplementary data related to cybersecurity of the endpoint while the endpoint is connected via an unsecured internet access point. In some embodiments, a portion of the additional data collected from the subset of managed endpoints according to the second collection criteria may be locally collected by the engine implemented on the managed endpoints.

At block 812, additional data may be collected. The additional data may be collected from the subset of managed endpoints according to the second collection criteria. In these and other embodiments, the portion of the additional data that is locally collected by the engine may be aggregated on the edge device. The modification to an element of the first collection criteria may include a modification to the edge processing function such that the second collection criteria include the modification to the edge processing function. Some examples include filtering larger amounts of the locally collected data.

At block 814, one or more computational operations may be adjusted. For instance, one or more computational operations included in the computation of the DEXI may be adjusted. The adjusted computational operation may be based on the additional data collected according to the second collection criteria. The adjust computational operation may be directed to analysis of the additional data relative to the defined event or may include a modification to computation of the DEXI to compensate for a reduction in data. At block 816, an endpoint context parameter may be output. The endpoint context parameter may result from the adjusted computational operation. For instance, the endpoint context parameter may result from a sub-process or sub-operation performed on the additional data.

At block 818, additional context data may be received. The additional context data may indicate that the defined event no longer exists in the managed network. For instance, the defined event may be mitigated through execution of a command that modifies a state or condition at one of the endpoints, a portion or component of the managed network, etc. Additionally or alternatively, the defined event may cease because the endpoint has changed geographic locations, modified a setting at an endpoint, etc.

Responsive to receipt of the additional context data (e.g., block 818), the method 800 may proceed to block 804 where data collection is continued from the managed endpoints according to the first collection criteria. The method 800 may proceed through 808, 810, 812, 814, 816, 818, or some combination thereof.

Further, modifications, additions, or omissions may be made to the method 800 without departing from the scope of the present disclosure. For example, the operations of method 800 may be implemented in differing orders. Furthermore, the outlined operations and actions are only provided as examples, and some of the operations and actions may be optional, combined into fewer operations and actions, or expanded into additional operations and actions without detracting from the disclosed embodiments.

For example, in some embodiments, the endpoints may include a first endpoint included in the managed endpoints and the defined event may include a technical event experienced at the first endpoint. In these and other embodiments, the method 800 may further include determining a shared probability between a first endpoint that is experiencing the technical event and one or more other endpoints of the managed network. For instance, the shared probability may quantify a likelihood of a second endpoint of the one or more other endpoints may experience the technical event. The shared probability may be based on the commonality of features at the first and second endpoint (or the one or more other endpoints). The feature may include a device type, products included on the endpoints, security settings of the endpoints, roles of uses of the endpoints, other features, or combinations thereof. In some implementations, the managed network may include multiple, entity-specific subnets. For instance, the managed network may include a first subnet operated and/or associated with a first entity and a second subnet operated and/or associated with a second, separate entity. In these and other implementations, the second endpoint may be a part of the second subnet while the first endpoint may be a part of the first subnet.

In these and other embodiments, the method 800 may include identifying the second endpoint of the managed endpoints that has not experienced the technical event and that includes the feature(s) in common with the first endpoint that increase a probability that the second endpoint experiences the technical event. The subset of managed endpoints may be defined to include the second endpoint such that the additional data is preemptively collected from the second endpoint according to the second collection criteria. The adjusted computational operation may include inspection of the additional data from the second endpoint for an indication of the technical event at the second endpoint.

The method 800 may be performed by the cloud management device 104 described elsewhere in the present disclosure or by another suitable computing system, such as the computer system 700 of FIG. 7. In some embodiments, the cloud management device 104 or the other computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system or the cloud management device 104 to perform or control performance of the method 800. Additionally or alternatively, the cloud management device 104 may include the processor 710 that is configured to execute computer instructions to cause the cloud management device 104 or other computing systems to perform or control performance of the method 800. The cloud management device 104 or the computer system 700 implementing the method 800 may be included in a cloud-based managed network, an on-premises system, or another suitable network computing environment. Although illustrated as discrete blocks, one or more blocks in FIG. 8 may be divided into additional blocks, combined into fewer blocks, or eliminated, depending on the desired implementation.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one"

or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of data collection optimization in a managed network having a digital experience (DEX) platform, the method comprising:

collecting data from a plurality of managed endpoints including a first endpoint and a second endpoint according to first collection criteria in a managed network, wherein: the first collection criteria include a first collection frequency and a first collection verbosity, the collected data and are used to compute a first digital experience index of a first user users of the first endpoint and a first digital experience of a second user of the second endpoints, and the first digital experience indices of the users are computed according to computational operations;

receiving, from the first endpoint, ticket data that indicates a technical event is experienced at the first endpoint, wherein the technical event includes a defined event;

responsive to the ticket data:

identifying from the collected data that the second endpoint has not experienced the technical event;

determining that the second endpoint includes a feature in common with the first endpoint that increases a probability that the second endpoint will experience the technical event; and responsive to a determination that the second endpoint includes the feature, defining a subset of managed endpoints to include the second endpoint and the first endpoint;

modifying one or both of the first collection frequency and the first collection verbosity to implement a second collection criteria relative to the subset of managed endpoints;

collecting additional data from the subset of managed endpoints according to the second collection criteria;

adjusting the computational operations included in the computation of the digital experience index, wherein adjusted computational operations are directed to analysis of the additional data relative to the defined event;

computing an additional digital experience index of the subset of managed endpoints based on the adjusted computational operations;

mitigating the technical event at the first endpoint by communicating instructions to the first endpoint that change a state or a condition at the first endpoint;

receiving context data in the collected additional data that indicates the defined event does not exist in the subset of managed endpoints; and responsive to receipt of the context data, collecting data from the plurality of managed endpoints according to the first collection criteria.

2. The method of claim 1, wherein a portion of the collected data collected according to first collection criteria and the additional data collected according to the second collection criteria is locally collected by an engine implemented on each of the plurality of managed endpoints.

3. The method of claim 2, wherein:

the portion of the collected data and the additional data that are locally collected by the engine is aggregated on an edge device;

the first collection criteria further include an edge processing function including one or both of filtering and aggregating the portion of the collected data and the additional data prior to use in the computation of the digital experience index; and the second collection criteria include a modification to the edge processing function.

4. The method of claim 3, further comprising defining a data collection policy, wherein:

the data collection policy includes one or more or a combination of:

the first collection frequency;

the first collection verbosity;

the defined event;

the edge processing function; and the second collection criteria; and the data collection policy is specified in a low-code interface implemented on a subnet of the managed network.

5. The method of claim 1, further comprising determining a shared probability between the first endpoint and a second endpoint, wherein:

the shared probability quantifies a likelihood of the second endpoint experiencing the technical event;

the shared probability is based on a commonality of the feature at the first and second endpoints; and the identifying the second endpoint is based at least partially on the shared probability.

6. The method of claim 1, further comprising responsive to the ticket data:

adjusting a computational operation based on the additional data collected according to the second collection criteria; and outputting an endpoint context parameter resulting from the adjusted computational operation, wherein the adjusted computational operation includes inspection of the additional data from the second endpoint for an indication of the technical event at the second endpoint.

7. The method of claim 6, further comprising responsive to the ticket data, adjusting a computational operation based on the additional data collected according to the second collection criteria, wherein the adjusted computation operation includes an adjustment of a calculation in the digital experience index.

8. The method of claim 1, wherein:

the first endpoint is included in a first subnet and the second endpoint is included in a second subnet;

the first subnet is associated with a first entity and the second subnet is associated with a second entity; and the first and the second subnets are separately managed by a cloud management device such that data and resources of the first subnet are not visible to the second subnet 136B and vice versa.

9. The method of claim 1, wherein a technical event includes a malfunctioning hardware, a security breach, an unpatched product, or malfunctioning product.

10. A non-transitory computer-readable medium having encoded therein programming code executable by one or more processors to perform or control performance of operations of data collection optimization in a managed network having a digital experience (DEX) platform, the operations comprising:

collecting data from a plurality of managed endpoints including a first endpoint and a second endpoint according to first collection criteria in a managed network, wherein: the first collection criteria include a first collection frequency and a first collection verbosity, the collected data and are used to compute a first digital experience index of a first user users of the first endpoint and a first digital experience of a second user of the second endpoints, and the first digital experience indices of the users are computed according to computational operations;

receiving, from the first endpoint, ticket data that indicates a technical event is experienced at the first endpoint, wherein the technical event includes a defined event;

responsive to the ticket data:

identifying from the collected data that the second endpoint has not experienced the technical event;

determining that the second endpoint includes a feature in common with the first endpoint that increases a probability that the second endpoint will experience the technical event; and responsive to a determination that the second endpoint includes the feature, defining a subset of managed endpoints to include the second endpoint and the first endpoint;

modifying one or both of the first collection frequency and the first collection verbosity to implement a second collection criteria relative to the subset of managed endpoints;

collecting additional data from the subset of managed endpoints according to the second collection criteria;

adjusting the computational operations included in the computation of the digital experience index, wherein adjusted computational operations are directed to analysis of the additional data relative to the defined event;

computing an additional digital experience index of the subset of managed endpoints based on the adjusted computational operations;

mitigating the technical event at the first endpoint by communicating instructions to the first endpoint that change a state or a condition at the first endpoint;

receiving context data in the collected additional data that indicates the defined event does not exist in the subset of managed endpoints; and responsive to receipt of the context data, collecting data from the plurality of managed endpoints according to the first collection criteria.

11. The non-transitory computer-readable medium of claim 10, wherein a portion of the collected data collected according to first collection criteria and the additional data collected according to the second collection criteria is locally collected by an engine implemented on each of the plurality of managed endpoints.

12. The non-transitory computer-readable medium of claim 11, wherein:

the portion of the collected data and the additional data that are locally collected by the engine is aggregated on an edge device;

the first collection criteria further include an edge processing function including one or both of filtering and aggregating the portion of the collected data and the additional data prior to use in the computation of the digital experience index; and the second collection criteria include a modification to the edge processing function.

13. The non-transitory computer-readable medium of claim 12, wherein:

the operations further comprise defining a data collection policy;

the data collection policy includes one or more or a combination of:

the first collection frequency;

the first collection verbosity;

the defined event;

the edge processing function; and the second collection criteria; and the data collection policy is specified in a low-code interface implemented on a subnet of the managed network.

14. The non-transitory computer-readable medium of claim 10, wherein:

the operations further comprise determining a shared probability between the first endpoint and a second endpoint;

the shared probability quantifies a likelihood of the second endpoint experiencing the technical event;

the shared probability is based on a commonality of the feature at the first and second endpoints; and the identifying the second endpoint is based at least partially on the shared probability.

15. The non-transitory computer-readable medium of claim 10, wherein:

the operations further comprise responsive to the ticket data:

adjusting a computational operation based on the additional data collected according to the second collection criteria; and outputting an endpoint context parameter resulting from the adjusted computational operation, wherein the adjusted computational operation includes inspection of the additional data from the second endpoint for an indication of the technical event at the second endpoint.

16. The non-transitory computer-readable medium of claim 15, wherein the operations further comprise responsive to the ticket data, adjusting a computational operation based on the additional data collected according to the second collection criteria, wherein the adjusted computation operation includes an adjustment of a calculation in the digital experience index.

17. The non-transitory computer-readable medium of claim 10, wherein:

the first endpoint is included in a first subnet and the second endpoint is included in a second subnet;

the first subnet is associated with a first entity and the second subnet is associated with a second entity; and the first and the second subnets are separately managed by a cloud management device such that data and resources of the first subnet are not visible to the second subnet 136B and vice versa.

18. The non-transitory computer-readable medium of claim 10, wherein a technical event includes a malfunctioning hardware, a security breach, an unpatched product, or malfunctioning product.

* * * * *